(12) United States Patent
Widener

(10) Patent No.: US 10,712,007 B2
(45) Date of Patent: Jul. 14, 2020

(54) PNEUMATICALLY-ACTUATED FUEL NOZZLE AIR FLOW MODULATOR

(71) Applicant: General Electric Company, Schenectady, NY (US)

(72) Inventor: Stanley Kevin Widener, Greer, SC (US)

(73) Assignee: General Electric Company, Schenectady, NY (US)

( * ) Notice: Subject to any disclaimer, the term of this patent is extended or adjusted under 35 U.S.C. 154(b) by 435 days.

(21) Appl. No.: 15/417,601

(22) Filed: Jan. 27, 2017

(65) Prior Publication Data

US 2018/0216827 A1 Aug. 2, 2018

(51) Int. Cl.
*F23R 3/26* (2006.01)
*F23R 3/28* (2006.01)
*F02C 3/04* (2006.01)

(52) U.S. Cl.
CPC ............... *F23R 3/26* (2013.01); *F02C 3/04* (2013.01); *F23R 3/283* (2013.01); *F05D 2240/35* (2013.01); *F05D 2270/08* (2013.01); *F23R 2900/00001* (2013.01); *Y02E 20/16* (2013.01)

(58) Field of Classification Search
CPC .... F23R 2900/00001; F23R 3/22; F23R 3/26; F23R 3/283; F23R 3/30; F23R 3/32; F23R 3/286; F23R 3/28
USPC ...................................................... 251/335.3
See application file for complete search history.

(56) References Cited

U.S. PATENT DOCUMENTS

| 799,256 | A | 9/1905 | Parker |
| 2,659,198 | A | 11/1953 | Cook |
| 2,787,440 | A | 4/1957 | Thompson, Jr. |
| 2,880,579 | A | 4/1959 | Harshman |
| 3,004,494 | A | 10/1961 | Corbett |
| 3,733,816 | A | 5/1973 | Grennan et al. |
| 3,851,998 | A | 12/1974 | Downing |
| 4,159,623 | A | 7/1979 | McReynolds |
| 4,255,927 | A | 3/1981 | Johnson et al. |
| 4,296,599 | A | 10/1981 | Adamson |
| 4,807,433 | A | 2/1989 | Maclin et al. |

(Continued)

FOREIGN PATENT DOCUMENTS

| EP | 0391288 B1 | 5/1994 |
| EP | 1189805 A1 | 3/2002 |

(Continued)

OTHER PUBLICATIONS

U.S. Appl. No. 15/417,579, Office Action dated Mar. 8, 2019, 22 pages.

(Continued)

*Primary Examiner* — Gerald L Sung
*Assistant Examiner* — Alyson Joan Harrington
(74) *Attorney, Agent, or Firm* — Charlotte Wilson; Hoffman Warnick LLC

(57) ABSTRACT

A flow modulator for a fuel nozzle, including: a fixed outer tube, the fixed outer tube including a set of apertures; a movable inner tube concentrically positioned within the fixed outer tube, the movable inner tube including a set of apertures; and a pneumatically actuated component for displacing the movable inner tube within the fixed outer tube to selectively align the set of apertures of the fixed outer tube with the set of apertures of the movable inner tube.

17 Claims, 6 Drawing Sheets

(56) References Cited

U.S. PATENT DOCUMENTS

| | | |
|---|---|---|
| 5,022,817 A | 6/1991 | O'Halloran |
| 5,051,065 A | 9/1991 | Hansen |
| 5,235,812 A | 8/1993 | Klaass et al. |
| 5,279,109 A | 1/1994 | Liu et al. |
| 5,349,812 A | 9/1994 | Taniguchi et al. |
| 5,548,951 A | 8/1996 | Mumford et al. |
| 5,557,920 A | 9/1996 | Kain |
| 5,575,616 A | 11/1996 | Hagle et al. |
| 5,716,423 A | 2/1998 | Krul et al. |
| 5,737,922 A | 4/1998 | Schoenman |
| 5,820,589 A | 10/1998 | Torgerson et al. |
| 5,906,238 A * | 5/1999 | Carmody ............... E21B 21/10 166/113 |
| 5,924,276 A | 7/1999 | Mowill |
| 5,988,589 A | 11/1999 | Mowill |
| 6,016,824 A | 1/2000 | Watanabe |
| 6,021,979 A | 2/2000 | Bender et al. |
| 6,022,197 A | 2/2000 | Cygnor et al. |
| 6,050,079 A | 4/2000 | Durgin et al. |
| 6,226,977 B1 | 5/2001 | Ichiryu et al. |
| 6,237,323 B1 | 5/2001 | Ojiro et al. |
| 6,250,066 B1 | 6/2001 | Lawrence et al. |
| 6,327,845 B2 | 12/2001 | Ojiro et al. |
| 6,390,733 B1 | 5/2002 | Burbage et al. |
| 6,416,279 B1 | 7/2002 | Weigand et al. |
| 6,449,956 B1 | 9/2002 | Kolman et al. |
| 6,471,675 B1 | 10/2002 | Rogers |
| 6,568,188 B2 | 5/2003 | Kolman et al. |
| 6,589,205 B1 | 7/2003 | Meadows |
| 6,595,098 B1 | 7/2003 | Wray |
| 6,622,475 B2 | 9/2003 | Brault et al. |
| 6,860,098 B2 | 3/2005 | Suenaga et al. |
| 6,892,543 B2 | 5/2005 | Nakae |
| 6,931,859 B2 * | 8/2005 | Morgan ............... F01D 17/141 137/494 |
| 6,979,315 B2 | 12/2005 | Rogers et al. |
| 7,000,396 B1 | 2/2006 | Storey |
| 7,200,986 B2 | 4/2007 | Sanders |
| 7,299,618 B2 | 11/2007 | Terazaki et al. |
| 7,340,880 B2 | 3/2008 | Magoshi et al. |
| 7,445,424 B1 | 11/2008 | Ebert et al. |
| 7,631,504 B2 | 12/2009 | Belsom |
| 7,698,894 B2 | 4/2010 | Wood et al. |
| 7,744,060 B2 * | 6/2010 | Sneh ............... F16K 7/14 251/331 |
| 7,823,389 B2 | 11/2010 | Seitzer et al. |
| 7,876,224 B2 | 1/2011 | Prokopuk |
| 8,083,205 B2 * | 12/2011 | Sneh ............... F16K 7/14 251/28 |
| 8,171,998 B1 * | 5/2012 | Darnell ............... E21B 34/10 166/320 |
| 8,267,863 B2 | 9/2012 | Najafi et al. |
| 8,275,533 B2 | 9/2012 | Davis, Jr. et al. |
| 8,281,601 B2 | 10/2012 | McMahan et al. |
| 8,307,662 B2 | 11/2012 | Turco |
| 8,322,346 B2 | 12/2012 | Najafi et al. |
| 8,549,864 B2 | 10/2013 | Langdon, II et al. |
| 8,596,035 B2 | 12/2013 | Mowill |
| 8,684,660 B2 | 4/2014 | Miranda et al. |
| 8,966,877 B2 | 3/2015 | McKinney |
| 9,028,206 B2 | 5/2015 | Liotta et al. |
| 9,052,115 B2 | 6/2015 | Stoia et al. |
| 9,097,084 B2 | 8/2015 | McDougall et al. |
| 9,243,802 B2 * | 1/2016 | Hawie ............... F23R 3/26 |
| 2002/0087120 A1 | 7/2002 | Rogers et al. |
| 2002/0148216 A1 | 10/2002 | Brault et al. |
| 2005/0159789 A1 | 7/2005 | Brockway et al. |
| 2005/0187509 A1 | 8/2005 | Wolf |
| 2006/0016195 A1 | 1/2006 | Dalla Betta et al. |
| 2006/0042256 A1 | 3/2006 | Storey |
| 2007/0074516 A1 | 4/2007 | Peck et al. |
| 2007/0137213 A1 | 6/2007 | Rickert et al. |
| 2007/0187634 A1 * | 8/2007 | Sneh ............... F16K 7/14 251/30.01 |
| 2007/0193274 A1 | 8/2007 | Belsom |
| 2007/0241931 A1 | 10/2007 | Compton et al. |
| 2007/0266705 A1 | 11/2007 | Wood et al. |
| 2008/0095652 A1 | 4/2008 | Jiang |
| 2008/0112798 A1 | 5/2008 | Seitzer et al. |
| 2008/0269573 A1 | 10/2008 | Najafi et al. |
| 2009/0005656 A1 | 1/2009 | Najafi |
| 2009/0148273 A1 | 6/2009 | Suciu et al. |
| 2009/0243855 A1 | 10/2009 | Prokopuk |
| 2009/0266079 A1 * | 10/2009 | Donnelly ............... F23R 3/10 60/737 |
| 2010/0236249 A1 | 9/2010 | McMahan et al. |
| 2011/0088405 A1 | 4/2011 | Turco |
| 2011/0173984 A1 | 7/2011 | Valeev et al. |
| 2011/0265486 A1 | 11/2011 | Plant |
| 2012/0039702 A1 | 2/2012 | Sharp |
| 2013/0000315 A1 | 1/2013 | Mowill |
| 2013/0046152 A1 | 2/2013 | Najafi et al. |
| 2013/0051976 A1 | 2/2013 | Kirtley |
| 2013/0145741 A1 * | 6/2013 | Hawie ............... F23R 3/26 60/39.23 |
| 2013/0152582 A1 | 6/2013 | Anschel et al. |
| 2013/0164157 A1 | 6/2013 | Roberts et al. |
| 2013/0283807 A1 | 10/2013 | Stoia et al. |
| 2013/0330168 A1 | 12/2013 | Liotta et al. |
| 2014/0102544 A1 | 4/2014 | Riley |
| 2014/0216051 A1 | 8/2014 | Johnson et al. |
| 2014/0127110 A1 | 9/2014 | Davis, III et al. |
| 2014/0255145 A1 | 9/2014 | Miranda et al. |
| 2015/0000939 A1 | 1/2015 | Willner |
| 2015/0013345 A1 | 1/2015 | Porter et al. |
| 2015/0377669 A1 | 12/2015 | DeSilva et al. |
| 2017/0191372 A1 | 7/2017 | Tralshawala et al. |

FOREIGN PATENT DOCUMENTS

| | | |
|---|---|---|
| EP | 1832751 A1 | 9/2007 |
| EP | 1770331 A3 | 9/2014 |
| GB | 2470253 A | 11/2010 |
| WO | 8602406 A1 | 4/1986 |
| WO | 9104395 A2 | 4/1991 |
| WO | 9727923 A1 | 8/1997 |
| WO | 2001002242 A1 | 1/2001 |
| WO | 20060660010 A1 | 6/2006 |
| WO | 2008127845 A1 | 10/2008 |
| WO | 2009006249 A1 | 1/2009 |
| WO | 2010072998 A1 | 7/2010 |
| WO | 2012030776 A1 | 3/2012 |
| WO | 2013001361 A2 | 1/2013 |
| WO | 2014099330 A1 | 6/2014 |
| WO | 2014178731 A2 | 11/2014 |
| WO | 2015176902 A1 | 11/2015 |

OTHER PUBLICATIONS

U.S. Appl. No. 15/237,795, Notice of Allowance dated Apr. 11, 2019, 12 pgs.

U.S. Appl. No. 14/983,779, Office Action dated Mar. 15, 2018, 34 pages.

Extended European Search Report and Opinion issued in connection with corresponding EP Application No. 16204159.4 dated Jul. 19, 2017.

U.S. Appl. No. 14/983,768, Office Action dated Apr. 4, 2018, 32 pages.

U.S. Appl. No. 14/983,774, Office Action dated Jul. 10, 2018, 46 pages.

U.S. Appl. No. 14/983,768, Notice of Allowance dated Sep. 24, 2018, 17 pages.

U.S. Appl. No. 15/237,795, Office Action dated Nov. 26, 2018, 34 pages.

U.S. Appl. No. 15/417,579, Final Office Action dated Aug. 1, 2019, 24 pgs.

U.S. Appl. No. 15/417,579 Notice of Allowance dated Apr. 8, 2020, 314984-US-1 (GEEN-0901-US), 11 pages.

* cited by examiner

US 10,712,007 B2

PNEUMATICALLY-ACTUATED FUEL NOZZLE AIR FLOW MODULATOR

BACKGROUND OF THE INVENTION

The disclosure relates generally to gas turbines, and more specifically, to a pneumatically-actuated air flow modulator for a fuel nozzle in a gas turbine.

Gas turbines typically include a compressor, a combustor section including one or more combustors, and at least one turbine section. Compressor discharge air is channeled into each combustor where fuel is injected via a plurality of fuel nozzles, mixed with air, and burned. The combustion gases are then channeled to the turbine section which extracts energy from the combustion gases.

Gas turbine combustion systems typically operate over a wide range of flow, pressure, temperature, and fuel/air ratio operating conditions. Controlling combustor performance is required to achieve and maintain satisfactory overall gas turbine system operation and to maintain acceptable emissions levels (e.g., NO and CO levels).

With conventional combustion systems, it is very difficult to meet emissions limits when even one fuel nozzle of a combustor is turned off. This is because the air that continues to flow through that fuel nozzle quenches the reactions of fuel and air in the flames from the remaining operating fuel nozzles, thereby preventing complete burnout of CO.

BRIEF DESCRIPTION OF THE INVENTION

A first aspect of the disclosure provides a flow modulator for a fuel nozzle, including: a fixed outer tube, the fixed outer tube including a set of apertures; a movable inner tube concentrically positioned within the fixed outer tube, the movable inner tube including a set of apertures; and a pneumatically actuated component for displacing the movable inner tube within the fixed outer tube to selectively align the set of apertures.

A second aspect of the disclosure provides a method for deactivating a fuel nozzle in a combustor of a gas turbine system, including: pneumatically displacing a movable inner tube within a fixed outer tube; and deactivating the fuel nozzle by displacing the movable inner tube within the fixed outer tube such that a set of apertures of the fixed outer tube and a set of apertures of the movable inner tube are misaligned.

A third aspect of the disclosure provides a flow modulator for a fuel nozzle, including: a fixed outer tube, the fixed outer tube including a set of apertures; a movable inner tube concentrically positioned within the fixed outer tube, the movable inner tube including a set of apertures; a pneumatically actuated component for displacing the movable inner tube within the fixed outer tube to selectively align the set of apertures of the fixed outer tube with the set of apertures of the movable inner tube, wherein the pneumatically actuated component includes a bellows system, the bellows system enclosing a bellows volume and supporting an end of the movable inner tube; a control valve; and a passage fluidly coupling the bellows volume with the control valve.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure. In the drawings, like numerals refer to like elements.

It is noted that the drawings of the disclosure are not necessarily to scale. The drawings are intended to depict only typical aspects of the disclosure, and therefore should not be considered as limiting the scope of the disclosure.

DETAILED DESCRIPTION OF THE INVENTION

Figure 1:
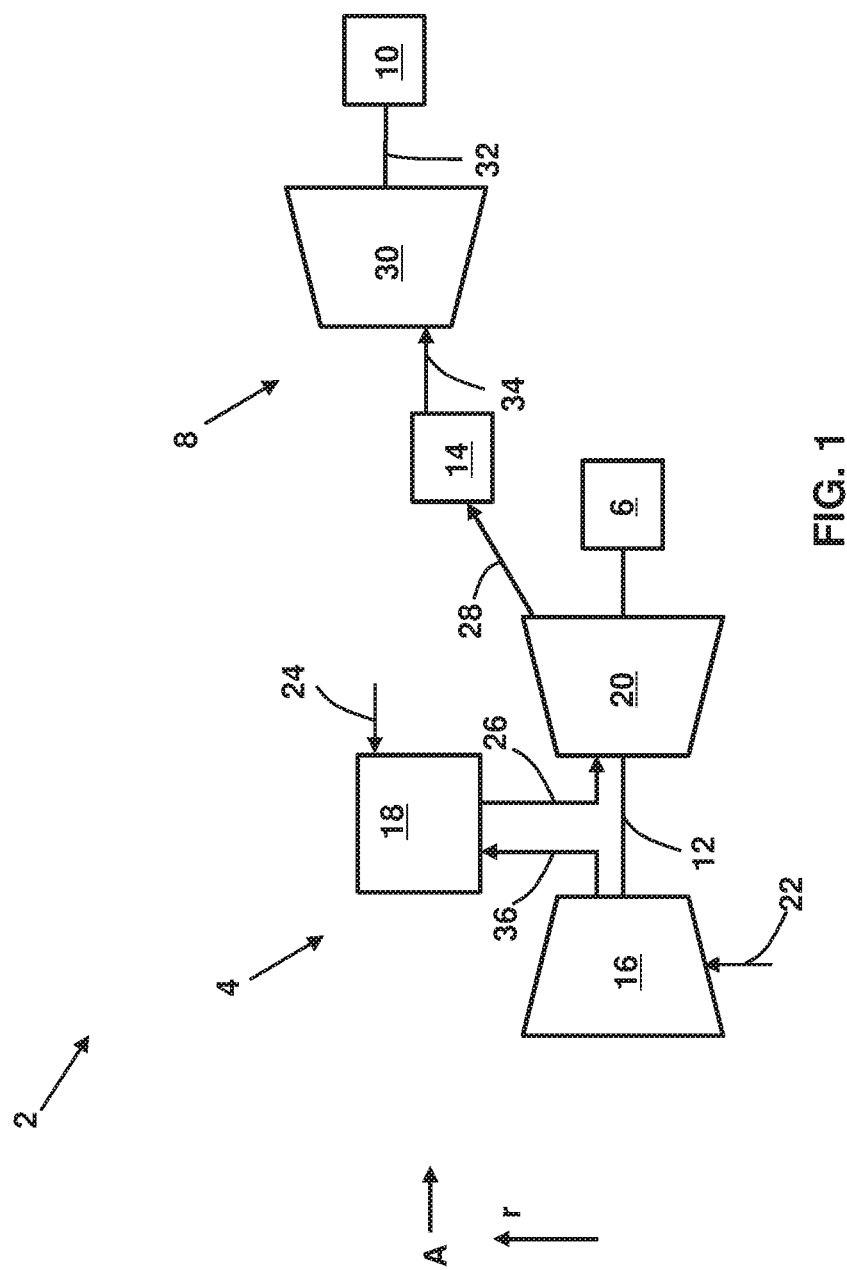
FIG. 1 is a schematic diagram of a combined cycle gas power generation system according to embodiments.

In the Figures, for example as shown in FIG. 1, the "A" axis represents an axial orientation. As used herein, the terms "axial" and/or "axially" refer to the relative position/direction of objects along axis A, which is substantially parallel with the axis of rotation of the turbomachine (in particular, the rotor section). As further used herein, the terms "radial" and/or "radially" refer to the relative position/direction of objects along an axis (r), which is substantially perpendicular with axis A and intersects axis A at only one location. In the description, a set of elements includes one or more elements.

Turning to FIG. 1, a schematic view of portions of an illustrative combined cycle power generating system 2 is shown. The combined cycle power generating system 2 includes a gas turbine system 4 operably connected to a generator 6, and a steam turbine system 8 operably coupled to another generator 10. The generator 6 and the gas turbine system 4 may be mechanically coupled by a shaft 12. Also shown in FIG. 1, a heat exchanger 14 is operably connected to the gas turbine system 4 and the steam turbine system 8. The heat exchanger 14 may be fluidly connected to both the gas turbine system 4 and the steam turbine system 8 via conventional conduits (numbering omitted).

The gas turbine system 4 includes a compressor system 16 and a combustor system 18. The gas turbine system 4 also includes a turbine section 20 coupled to the shaft 12. In operation, air 22 enters an inlet of the compressor system 16, is compressed, and then discharged to the combustor system 18 where a supply of fuel 24 is burned to provide high energy combustion gases 26, which drive the turbine section 20. Typically, the combustor system 18 includes a plurality of fuel nozzles for injecting fuel into a combustion area of the combustor section 18. In the turbine section 20, the energy of the hot gases is converted into work, some of which is used to drive the compressor system 16 through the rotating shaft 12, with the remainder available for useful work to drive a load such as the generator 6 via the shaft 12 for producing electricity.

FIG. 1 also represents the combined cycle in which the energy in the exhaust gases 28 exiting the turbine section 20 are converted into additional useful work. The exhaust gases 28 enter the heat exchanger 14 in which water is converted to steam 34. The steam turbine system 8 may include one or more steam turbines 30 (only one is shown), e.g., a high pressure (HP) turbine, an intermediate pressure (IP) turbine, and a low pressure (LP) turbine, each of which are coupled to a shaft 32. The steam turbine 30 includes a plurality of rotating blades (not shown) mechanically coupled to the shaft 32. In operation, steam 34 from the heat exchanger 14 enters an inlet of the steam turbine 30 and is channeled to impart a force on the blades of the steam turbine 30 causing the shaft 32 to rotate. The rotating shaft 32 may be coupled to the generator 10 to produce additional electric power.

Figure 2:
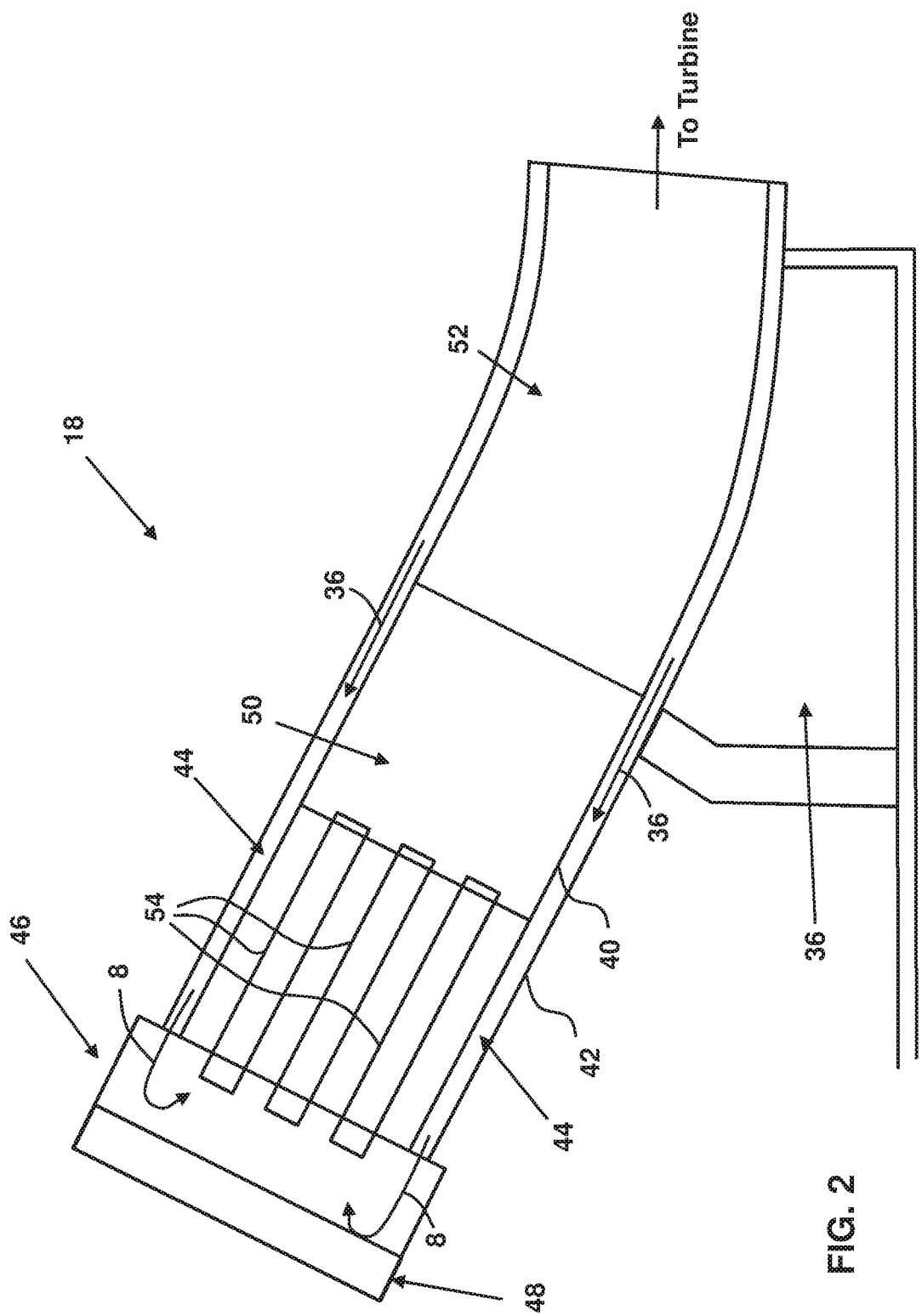
FIG. 2 is a cross-sectional illustration of a combustor section of a gas turbine system according to embodiments.

FIG. 2 depicts a simplified cross-sectional illustration of a combustor section 18 (hereafter "combustor 18") of a gas turbine system 4 according to embodiments.

The combustor 18 of the gas turbine system 4 includes a combustor chamber 40 enclosed within a compressor discharge casing 42. Generally described, the volume 44 located between the combustor chamber 40 and the compressor discharge casing 42 receives a flow of compressed air 36 discharged from the compressor section 16. The flow of compressed aft 36 passes through the volume 44 toward a head end 46 of the combustor 18, which is closed by an end cover assembly 48.

The combustor chamber 40 further includes a reaction zone 50 in which a mixture of fuel and air is ignited and burned to form a flow of hot gas. A transition duct 52 at the aft end of the combustor chamber 40 directs the flow of hot gas from the reaction zone 50 to the turbine section 20 where the hot gas may be used, for example, to drive a rotor shaft (e.g., shaft 12, FIG. 1) to produce power. The end cover assembly 48 may include various supply passages, manifolds, and associated valving (not shown in FIG. 2) for supplying fuel to a plurality of fuel nozzles 54, which are configured to inject fuel and/or premixed air/fuel into the reaction zone 50 for combustion. Other fluids (e.g., air, water, oil, and/or the like) may also be supplied to the fuel nozzles 54 and/or other components of the combustor 18 through the end cover assembly 48.

Extended turndown is highly desirable in today's power market where renewable energy sources are increasingly prevalent. These renewable energy sources are changing the operating profile for conventional power plants, driving more cyclic operation. With greater turndown, it is more economical to keep a gas turbine running at very low power during low periods of power demand, and available to add power to the grid as soon as the power output of renewable energy sources decreases (e.g., due to changes in input of wind or solar energy over the course of a day). Such turndown often involves "turning off" fuel supplied to one or more fuel nozzles in a combustor of a gas turbine.

As stated above, with conventional combustion systems, it is very difficult to meet emissions limits when even one fuel nozzle of a combustor is turned off. This is because the air that continues to flow through that fuel nozzle quenches the reactions of fuel and air in the flames from the remaining operating fuel nozzles, thereby preventing complete burnout of CO.

According to the present disclosure, a flow modulator is provided for selectively controlling air flow to a fuel nozzle (e.g., a turned-off fuel nozzle) of a gas turbine system. This reduces deleterious cold-air quenching of flame temperature, and maintains BTV (burner tube velocity) in other fueled fuel nozzles for part-load flame holding protection. The flow modulator uses a flow screen, with variable area, at an air inlet of the fuel nozzle to control air flow into at least a portion of the fuel nozzle. The flow modulator may be actively or passively actuated. Bellows elements may be used to support and control the moving components of the flow modulator.

Figure 3:
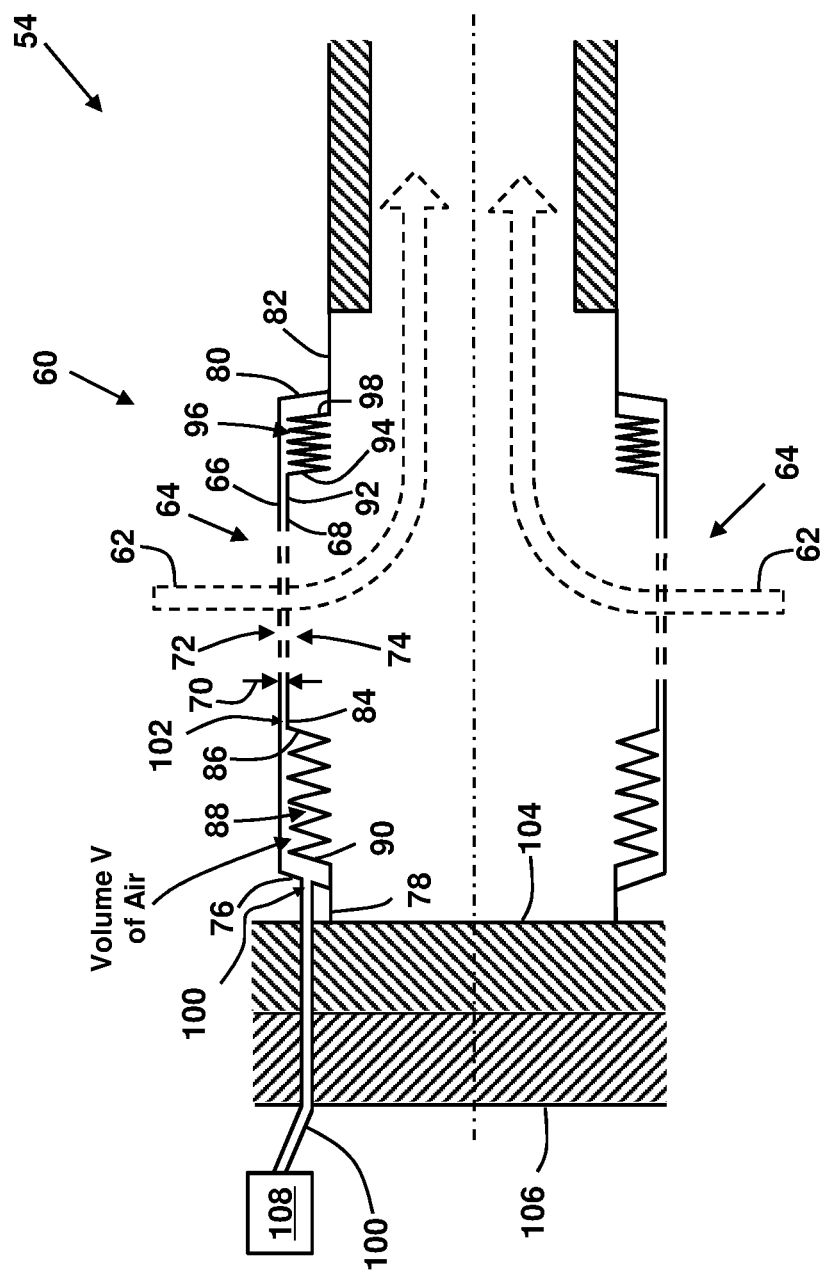
FIG. 3 is a cross-sectional view of a flow modulator in an open state according to embodiments.
Figure 4:
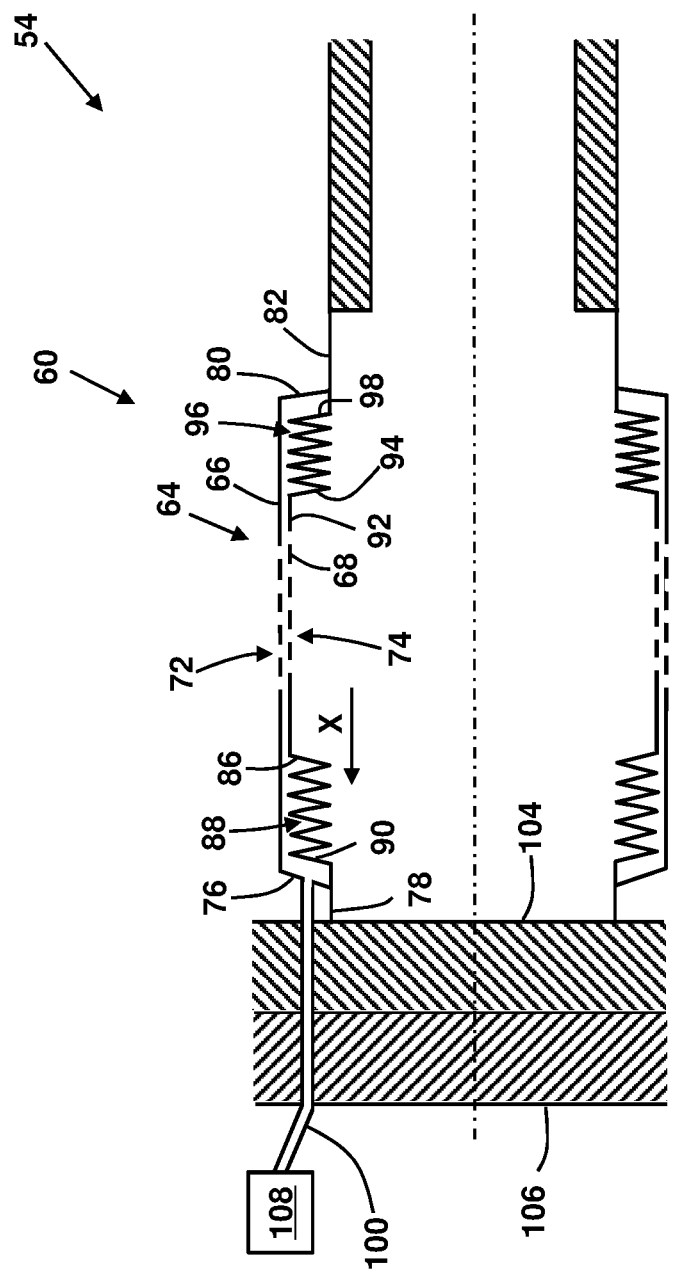
FIG. 4 is a cross-sectional view of the flow modulator of FIG. 3 in a closed state according to embodiments.

A flow modulator 60 according to embodiments is depicted in FIGS. 3 and 4, where the flow modulator 60 is shown in an open state in FIG. 3 and in a closed state in FIG. 4. According to embodiments, the flow modulator 60 is used to control the flow of air 62 (or other fluid) into one or more air inlets 64 of a fuel nozzle 54. The supplied air 62 may be directed to a swirler assembly or other portion of the fuel nozzle 54.

As shown in FIG. 3, the flow modulator 60 includes a fixed outer tube 66 and a concentric, movable inner tube 68, which is configured for axial movement within the fixed outer tube 66. A gap 70 may be present between the fixed outer tube 66 and the movable inner tube 68. The fixed outer tube 66 includes at least one set of apertures 72 (five sets of apertures 72 in this example). The movable inner tube 68 includes at least one matching set of apertures 74 (five sets of apertures 74 in this example). The apertures 72, 74 may be machined into the fixed outer tube 66 and the movable inner tube 68, or may be formed in any other suitable manner. Together, the sets of apertures 72, 74 form a flow screen, with variable area, which may be controlled to regulate the flow of air 62 passing into the fuel nozzle 54 via the air inlet(s) 64.

When the flow modulator 60 is in a fully open state as depicted in FIG. 3, each set of apertures 72 in the fixed outer tube 66 is fully aligned with a corresponding set of apertures 74 in the movable inner tube 68. To this extent, air 62 may flow freely through the flow modulator 60 into the fuel nozzle 54 via the air inlet(s) 64.

A first end 76 of the fixed outer tube 66 is fixedly coupled to a support 78. The support 78 may include, for example, a body of the fuel nozzle 54 as shown in FIG. 3. A second end 80 of the fixed outer tube 66 is fixedly coupled to a support 82, which may include, for example, a burner tube of the fuel nozzle 54.

The movable inner tube 68 is configured for axial movement within the fixed outer tube 66. An end 84 of the movable inner tube 68 is coupled to, and supported by, an inner end 86 of a first bellows 88. An outer end 90 of the first bellows 88 is coupled to the support 78 (or the fixed outer tube 66). An opposite end 92 of the movable inner tube 68 is coupled to, and supported by, an inner end 94 of a second bellows 96. An outer end 98 of the second bellows 96 is coupled to the support 82 (or the fixed outer tube 66). In non-limiting embodiments, the first and second bellows 88, 96 may extend circumferentially about the movable inner tube 68. Each of the first and second bellows 88, 96 may be formed of metal or other material suitable for providing the functionality described herein. When one of the first and second bellows 88, 96 is compressed, the other of the first and second bellows 88, 94 expands, and vice-versa, as the movable inner tube 68 moves within the fixed outer tube 66. According to embodiments, the movable inner tube 68 does not physically contact the fixed outer tube 68 as the movable inner tube 68 moves within the fixed outer tube 66.

A volume V of air is enclosed between the first bellows 88 and the fixed outer tube 66. Air may enter into and escape from this volume via first and second passages 100, 102. The passage 100 extends through a base 104 of the fuel nozzle 54 and an endcover 106 of the combustor 18 to a control valve 108, which is located outside the combustor 18, and which vents to atmosphere or other suitable low-pressure sink. The passage 102 is formed by the gap between the fixed outer tube 66 and the movable inner tube 68.

During normal operation, the control valve 108 is closed, and the pressure of the air enclosed within the volume V of air between the first bellows 88 and the fixed outer tube 66 equalizes with the surrounding air pressure. This results in no net pressure difference, which allows the first bellows 88 to relax to its free state. When the first bellows 88 is in this state, the inner movable tube 68 is positioned relative to the fixed outer tube 66 such that the sets of apertures 72, 74 are aligned. This configuration is depicted in FIG. 3. As such, the flow of air 62 can pass freely through the sets of apertures 72, 74 to feed air into the fuel nozzle (e.g., to a swirler assembly for mixing with fuel).

Under some operational conditions (e.g., for turndown or low gas turbine load), the fuel supply to the fuel nozzle 54 may be turned off. According to embodiments, as the fuel is being turned off, the control valve 108 may be opened (e.g., in response to a command), allowing air to escape through the passage 100 from the volume V of air between the first bellows 88 and the fixed outer tube 66. This results in a decrease in pressure within the volume V. When the pressure in the volume V reaches a value sufficiently lower than a designated pressure (e.g., the compressor discharge pressure ($P_{CD}$)), the first bellows 88 compresses as shown in FIG. 4, thereby shifting the movable inner tube 68 in direction X to a second position where the sets of apertures 72, 74 are now misaligned. In this state, the flow of air 62 into the fuel nozzle 54 through the air inlet(s) 64 is substantially blocked. The second bellows 96, which basically serves to support the opposite end 92 of the movable inner tube 68, expands as the first bellows 88 contracts.

When the control valve 108 is turned off, the pressure in volume V will once again equalize with the surrounding air pressure. As a result, the first bellows 88 expands to displace the movable inner tube 68 back to the position shown in FIG. 3, such that the sets of apertures 72, 74 are again aligned. The flow of air 62 can now pass freely through the sets of apertures 72, 74 to feed air into the fuel nozzle (e.g., to a swirler assembly for mixing with fuel).

The flow modulator 60 is pneumatically actuated and includes minimal component contact while reacting to mechanical loads. There are no load-bearing, sliding interfaces in the hot environment of the combustor, so component wear is not a problem. The flow modulator 60 operates using On-Off actuation, so precise, proportional flow control is not needed. Of course, in other embodiments, the flow modulator 60 could be configured to allow an intermediate flow of air to pass into a fuel nozzle.

Use of the flow modulator 60 with a fuel nozzle 54 extends the operating range (turndown) of low-emissions combustion systems. The flow modulator 60 may also be used in conjunction in combustors having variable-area bypass. When bypassing air from the head-end, flow modulator 60 can compensate for low velocity in fueled fuel nozzles to prevent flashback or flameholding, while also maintaining backflow margin.

Figure 5:
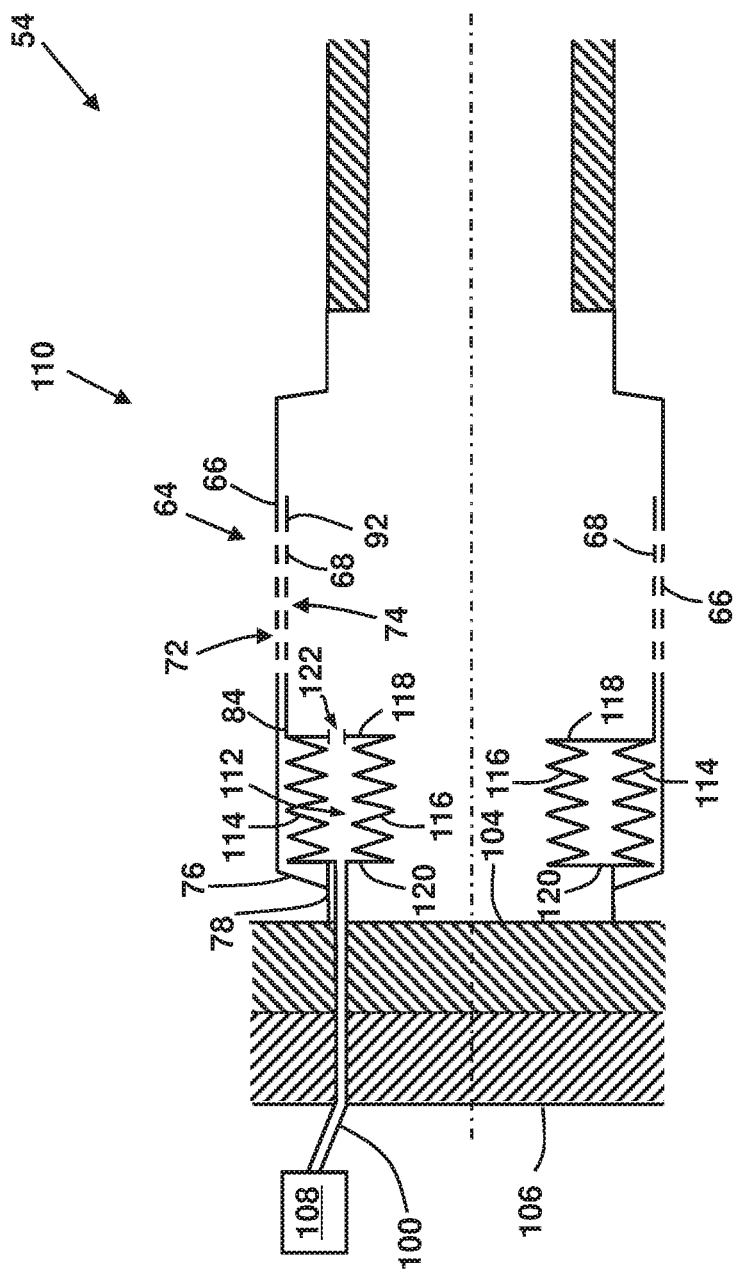
FIG. 5 is a cross-sectional view of a flow modulator in an open state according to additional embodiments.
Figure 6:
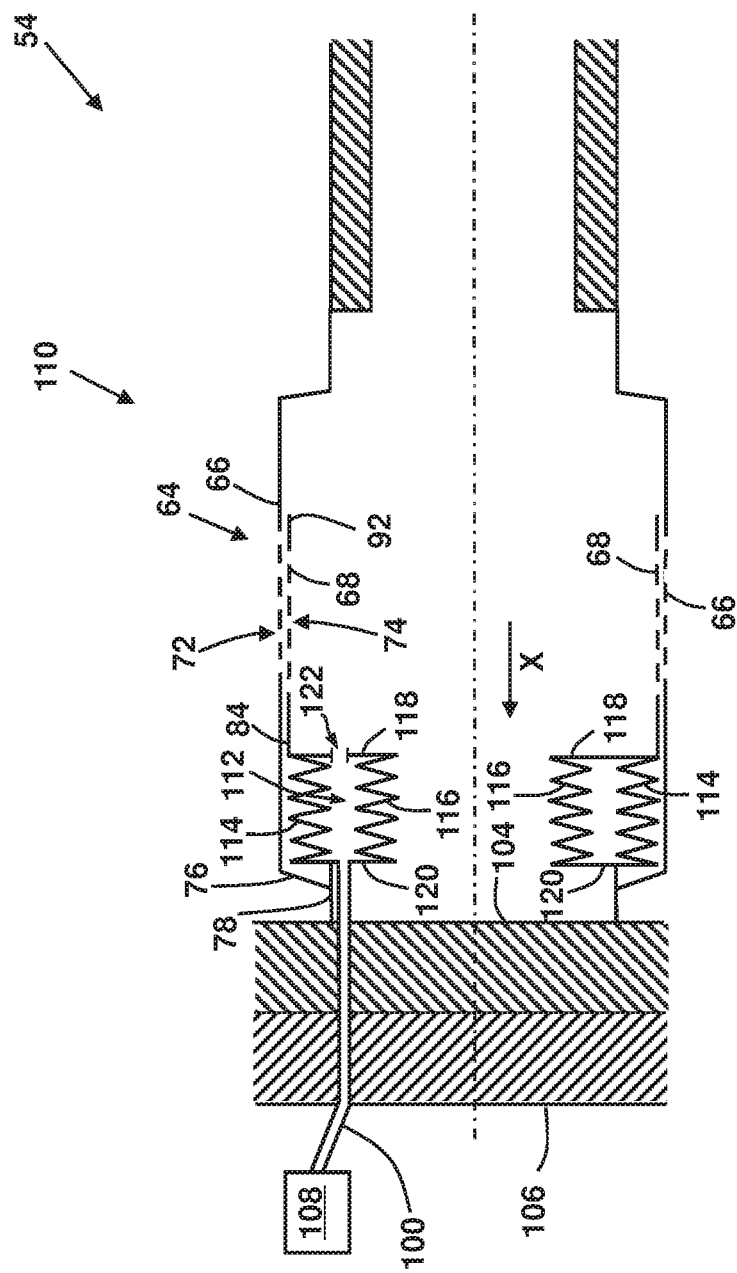
FIG. 6 is a cross-sectional view of a flow modulator in a closed state according to additional embodiments.

FIGS. 5 and 6 are cross-sectional views of a flow modulator 110 in an open state (FIG. 5) and a closed state (FIG. 6) according to additional embodiments. The flow modulator 110 includes a bellows volume 112 defined by a pair of concentric, cylindrical bellows components 114, 116 coupled between a pair of ring shaped end plates 118, 120. The bellows components 114, 116 and end plates 118, 120 may be formed of metal or other material suitable for providing the functionality described herein.

The end 84 of the movable inner tube 68 may be coupled to, and supported by, the bellows component 114 and/or end plate 118. The end plate 120 is coupled to, and supported by, the support 78. The opposite end 92 of the movable inner tube 68 is guided within the fixed outer tube 66, and is otherwise unsupported.

At least one orifice 122 is formed (e.g., drilled) through the end plate 118. When the control valve 108 is closed, the orifice(s) 122 allow air to enter and pressurize the bellows volume 112, equalizing the pressure with the surrounding air (e.g., at a pressure $P_{CD}$). In the fully open state (FIG. 5), each set of apertures 72 in the fixed outer tube 66 is fully aligned with a corresponding set of apertures 74 in the movable inner tube 68. To this extent, air 62 may flow freely through the flow modulator 110 into the fuel nozzle 54 via the air inlet(s) 64.

For turndown, low gas turbine load, or other operational conditions, the fuel supply to the fuel nozzle 54 may be turned off. According to embodiments, as the fuel is being turned off, the control valve 108 may be opened (e.g., in response to a command). When the control valve 108 is open, air flow through the orifice(s) 122 creates a pressure drop and reduces the pressure in the bellows volume 112. This causes the bellows components 114, 116 to contract. As shown in FIG. 6, contraction of the bellows components 114, 116 displaces the movable inner tube 68 in direction X to a second position where the sets of apertures 72, 74 are now misaligned. In this state, the flow of air 62 into the fuel nozzle 54 through the air inlet(s) 64 is substantially blocked.

When the control valve 108 is subsequently turned off, air flows into the bellows volume 112 via the aperture(s) 122 and the pressure in the bellows volume 112 will once again equalize with the surrounding air pressure. As a result, the bellows components 114, 116 expand to displace the movable inner tube 68 back to the position shown in FIG. 5, such that the sets of apertures 72, 74 are again aligned. The flow of air 62 can now pass freely through the sets of apertures 72, 74 to feed air into the fuel nozzle (e.g., to a swirler assembly for mixing with fuel).

The embodiment depicted in FIGS. 5 and 6 provides many of the advantages discussed above with regard to the embodiment shown in FIGS. 3 and 4. Further, it eliminates the potential difficulty of maintaining the size of the gap between the fixed outer tube 66 and the movable inner tube 68 to a small value or tight tolerance. In this embodiment, the orifice(s) 122 can be precisely calibrated to assure that the outflow of air through the control valve 108 is consistent nozzle-to-nozzle, and small relative to the total nozzle flow.

In various embodiments, components described as being "coupled" to one another can be joined along one or more interfaces. In some embodiments, these interfaces can include junctions between distinct components, and in other cases, these interfaces can include a solidly and/or integrally formed interconnection. That is, in some cases, components that are "coupled" to one another can be simultaneously formed to define a single continuous member. However, in other embodiments, these coupled components can be formed as separate members and be subsequently joined through known processes (e.g., fastening, ultrasonic welding, bonding).

When an element or layer is referred to as being "on", "engaged to", "connected to" or "coupled to" another element, it may be directly on, engaged, connected or coupled to the other element, or intervening elements may be present. In contrast, when an element is referred to as being "directly on," "directly engaged to", "directly connected to" or "directly coupled to" another element, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A flow modulator and fuel nozzle assembly, comprising:
   a fuel nozzle; and
   a flow modulator for the fuel nozzle, the flow modulator including:
   a fixed outer tube, the fixed outer tube including a set of apertures;
   a movable inner tube concentrically positioned within the fixed outer tube, the movable inner tube including a set of apertures;
   a first bellows for displacing the movable inner tube within the fixed outer tube to selectively align the set of apertures of the fixed outer tube with the set of apertures of the movable inner tube, the first bellows extending circumferentially about a first end of the movable inner tube and supporting the first end of the movable inner tube; and
   a second bellows for supporting an opposite end of the movable inner tube, the second bellows extending circumferentially about the opposite end of the movable inner tube.

2. The flow modulator and fuel nozzle assembly according to claim 1, further including a flow of air, wherein the flow of air passes into the fuel nozzle when the set of apertures of the fixed outer tube are aligned with the set of apertures of the movable inner tube.

3. The flow modulator and fuel nozzle assembly according to claim 2, wherein the flow of air is prevented from passing into the fuel nozzle when the set of apertures of the fixed outer tube are misaligned with the set of apertures of the movable inner tube.

4. The flow modulator and fuel nozzle assembly according to claim 1, wherein the first and second bellows support the movable inner tube such that the movable inner tube does not physically contact the fixed outer tube as the movable inner tube is displaced within the fixed outer tube.

5. The flow modulator and fuel nozzle assembly according to claim 1, wherein the first and second bellows comprise metal.

6. The flow modulator and fuel nozzle assembly according to claim 1, further including a volume of air enclosed between the first bellows and the fixed outer tube.

7. The flow modulator and fuel nozzle assembly according to claim 6, further including:
   a control valve; and
   a passage fluidly coupling the volume of air enclosed between the first bellows and the fixed outer tube with the control valve.

8. The flow modulator and fuel nozzle assembly according to claim 7, wherein the first bellows is in an expanded state when the control valve is closed and wherein the second bellows is in a contracted state when the control valve is closed.

9. The flow modulator and fuel nozzle assembly according to claim 8, wherein the set of apertures of the fixed outer tube are aligned with the set of apertures of the movable inner tube when the first bellows is in the expanded state and the second bellows is in the contracted state.

10. The flow modulator and fuel nozzle assembly according to claim 7, wherein a pressure of the volume of air between the first bellows and the fixed outer tube decreases when the control valve is open.

11. The flow modulator and fuel nozzle assembly according to claim 10, wherein the first bellows is in a contracted state and the second bellows is in an expanded state when the pressure of the volume of air between the first bellows and the fixed outer tube reaches a predetermined value.

12. The flow modulator and fuel nozzle assembly according to claim 11, wherein the set of apertures of the fixed outer tube are misaligned with the set of apertures of the movable inner tube when the first bellows is in the contracted state and the second bellows is in the expanded state.

13. The flow modulator and fuel nozzle assembly according to claim 1, wherein the fuel nozzle is disposed in a combustor of a gas turbine system.

14. A method for deactivating a fuel nozzle in a combustor of a gas turbine system, comprising:
   the fuel nozzle; and
   a flow modulator for the fuel nozzle, the flow modulator including:
   a fixed outer tube, the fixed outer tube including a set of apertures;
   a movable inner tube concentrically positioned within the fixed outer tube, the movable inner tube including a set of apertures;
   a first bellows for displacing the movable inner tube within the fixed outer tube to selectively align the set of apertures of the fixed outer tube with the set of apertures of the movable inner tube, the first bellows extending circumferentially about a first end of the movable inner tube and supporting the first end of the movable inner tube; and
   a second bellows for supporting an opposite end of the movable inner tube, the second bellows extending circumferentially about the opposite end of the movable inner tube;
   pneumatically displacing the movable inner tube within the fixed outer tube; and
   deactivating the fuel nozzle by displacing the movable inner tube within the fixed outer tube such that the set of apertures of the fixed outer tube and the set of apertures of the movable inner tube are misaligned.

15. The method of claim 14, wherein the pneumatically displacing further includes reducing a pressure between the fixed outer tube and the first bellows coupled to the movable inner tube.

16. The method of claim 15, wherein the reduction in pressure causes a contraction of the first bellows and a displacement of the movable inner tube coupled thereto.

17. A flow modulator and fuel nozzle assembly, comprising:
- a fuel nozzle; and
- a flow modulator for the fuel nozzle, the flow modulator including:
  - a fixed outer tube, the fixed outer tube including a set of apertures;
  - a movable inner tube concentrically positioned within the fixed outer tube, the movable inner tube including a set of apertures;
  - a pneumatically actuated component for displacing the movable inner tube within the fixed outer tube to selectively align the set of apertures of the fixed outer tube with the set of apertures of the movable inner tube, wherein the pneumatically actuated component includes a bellows system for displacing and supporting a first end of the movable inner tube, the bellows system including concentric, cylindrical bellows components coupled between a pair of end plates, the bellows system enclosing a bellows volume between the concentric, cylindrical bellows components;
  - a control valve; and
  - a passage fluidly coupling the bellows volume with the control valve, the passage fluidly coupled with the bellows volume via an orifice formed in one of the end plates.

* * * * *